United States Patent [19]
Peter

[11] Patent Number: 5,816,034
[45] Date of Patent: Oct. 6, 1998

[54] BELT DESIGN FOR MOWER

[76] Inventor: Timothy Jon Peter, 1270 Waterbury Dr., Medina, Ohio 44256

[21] Appl. No.: 783,883

[22] Filed: Jan. 16, 1997

Related U.S. Application Data

[63] Continuation-in-part of Ser. No. 679,195, Jul. 12, 1996.
[51] Int. Cl.⁶ ............................ A01D 34/76; A01D 34/66
[52] U.S. Cl. ................................ 56/11.4; 56/11.6; 56/11.8
[58] Field of Search ...................... 56/11.6, 11.4, 56/11.5, 11.8, 11.3, 10.8, 11.7, DIG. 4, DIG. 6, DIG. 22

[56] References Cited

U.S. PATENT DOCUMENTS

| | | | |
|---|---|---|---|
| 4,231,215 | 11/1980 | Klas | 56/11.6 |
| 4,328,659 | 5/1982 | Seyerle | 56/11.8 |
| 4,768,997 | 9/1988 | Page et al. | 474/84 |
| 4,813,215 | 3/1989 | Chase et al. | 56/11.6 |
| 5,077,959 | 1/1992 | Wenzel | 56/11.1 |
| 5,127,215 | 7/1992 | Wenzel | 56/11.1 |
| 5,361,566 | 11/1994 | Hohnl | 56/11.6 |

*Primary Examiner*—Terry Lee Melius

[57] ABSTRACT

A single belt drive system for a grounds care device using two transmission power units to provide directional drive to the wheels. The single belt arrangement allows the vehicle to have two identical transmission power units due to the asymmetric design.

17 Claims, 3 Drawing Sheets

BELT DESIGN FOR MOWER

This is a Continuation-in-Part of U.S. patent application Ser. No. 08/679,195 filed Jul. 12, 1996.

BACKGROUND OF THE INVENTION

1. Field of Invention

This invention relates to a belt drive system for wheeled vehicles and, more specifically, to riding lawnmowers.

2. Description of the Related Art

Modern ground and lawn care equipment, whether walk-behind mowers or riding mowers, typically have some sort of drive system extending from a source of power to the drive wheels. The drive systems can transmit the power to the wheels, thus relieving the operator of physically manipulating the device around the lawn or grounds. Transmissions which accomplish this are normally single piece units having a single input drive shaft and a specially designed transmission casing interconnected to both axles, providing the entire drive system in a single package. Other devices have separate drive systems for each side of the device with these special drive systems specifically designed for the specific application. Typically, this necessitates having a system specially designed for the right side of the device being distinct from that specially designed for the left side of the device. Also, some sort of complex direction or reversing mechanism has to be incorporated into either or both units, or to the drive system, which interconnects them both to the engine. These special designs are expensive to design, manufacture, and repair.

The present invention relates to belt driven vehicles and, more particularly, to a belt driven system for lawn and garden tractors and other vehicles which have dual transmission power units for two wheels.

Modern ground care devices typically have some sort of engine-powered wheel drive. Belt drive systems are often utilized for transferring power from the vehicle power source or engine to the mower deck. An engine drive shaft has a pulley attached where the belt rides along and through a series of other pulleys and transfers power to another feature of the ground care device, such as a cutting unit.

Mower units having hydrostatic power units have an input shaft driven by the engine, with a drive that is connected to the left and/or right drive wheel. A speed regulator on each hydrostatic transmission permits adjusting the speed ratio of the output drive shaft to the input shaft within a continuous range from reverse through neutral, wherein the respective output drive shaft is adjustable from idle to maximum forward. These devices typically have left and right speed control levers.

The two hydrostatic transmissions are mounted and are spaced apart a distance sufficient to allow a mower cutting belt to pass between them. The drive pulleys for the two hydrostatic transmissions are mounted to the same output drive shaft as that of the cutting belt drive pulley. Up to this point, each hydrostatic power unit had a separate drive belt. Also, the left and right hydrostatic drive units are typically symmetrical with one another. This situation has limited the choices of designers to hydrostatic transmissions which are symmetrical. Further, vehicles were required to carry two different transmissions, one for the left side of the vehicle and the other for the right side of the vehicle. The need for two different transmissions increased inventory and housing costs because both transmissions would generally not require service or replacement at the same time. This means the vehicle would unnecessarily be taken out of service twice as frequently.

In the preferred embodiment, the need for three or more belts is eliminated. The hydrostatic power units are arranged asymmetrically which allows the identical hydrostatic power units to be used one on each side. As stated above, the typical arrangements discussed above needed two non-identical hydrostatic power units, one for the right side of the vehicle and another for the left side of the vehicle. Each of these two power units could only be used on their respective sides.

The arrangement of the belt drive system, in the preferred embodiment, allows for two each of one basic hydrostatic power unit which is adaptable to either side. This eliminates the need for two non-identical hydrostatic units and eliminates the cost and repairs associated with having each hydrostatic power unit dependent upon a left or right hand.

SUMMARY OF THE INVENTION

According to one aspect of the invention, a belt drive system for use with a dual, hydrostatic power unit having an input shaft capable of being driven includes a driving belt pulley mounted on an engine drive shaft, an idler belt pulley, a right-hand hydrostatic power unit pulley, a left-hand hydrostatic power unit pulley, and a drive belt.

According to another aspect of the invention, the belt drive system includes a cutting belt system. The cutting belt system includes a driving belt pulley, right-hand and left-hand blade spindle belt pulleys, first, second and third idler belt pulleys and a cutting belt.

It is an object of this invention to provide a new and improved belt design which provides and utilizes one belt for the drive unit. The drive unit incorporates two hydrostatic power units either of which may be used on either side of the vehicle. This design is simple, effective in use, and provides better and more advantageous overall results.

It is another object of this invention to simplify the construction of drive systems.

It is yet another object of this invention to reduce the size of drive systems.

It is still another object of this invention to reduce the complexity of drive systems.

It is a further object of this invention to lower the cost to build and repair drive systems.

Other objects and a more complete understanding of the invention may be had by referring to the drawings.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
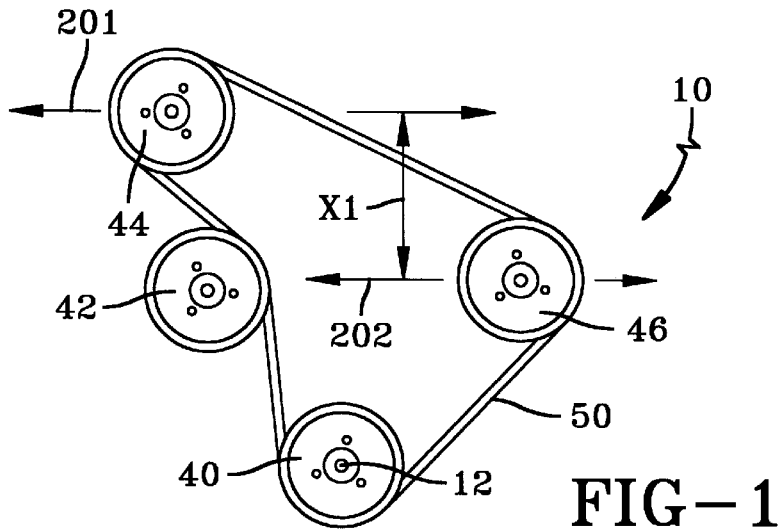
FIG. 1 is an illustration of the belt drive system arrangement of the present invention.

Referring now to the drawings, FIG. 1 illustrates a belt drive system 10 of the present invention. The belt drive system 10 is adapted for use with a ground care device. The device may be a riding lawnmower, a walk-behind lawnmower, a tractor, a utility vehicle or other vehicle.

These types of vehicles typically include an internal combustion engine having an engine drive shaft. FIG. 1 shows engine drive shaft 12 being attached to drive pulley 40 which drives the drive belt 50. Conventional V belts are typically used for various types of drive mechanisms and are typically formed from rubber or a rubber composition including flexible reinforcing cords extending longitudinally therealong. In one embodiment, the drive belt 50 runs along an idler pulley 42, which is usually spring-loaded, a left-hand hydrostatic power unit pulley 44 and a right-hand hydrostatic power unit pulley 46. The left-hand and right-hand hydrostatic power unit pulleys 44, 46 are asymmetrical with respect to each other. This can be observed by noting the longitudinal distance X1 between lines 201, 202 which are lines through the centers of left-hand and right-hand hydrostatic power unit pulleys 44, 46 respectively. Lines 201, 202 are parallel to output shafts 34a, 34b (shown in FIGS. 2 and 3) which will be discussed further below. Preferably, longitudinal distance X1 is in the range of 1.0 inch to 36.0 inches though other distances chosen with sound engineering judgement could also be used. Other minor adjustments of the arrangements of the belt drive system 10 are within the scope of this invention, however, are limited by the transmission units discussed below. Tensioning of the drive belt 50 is accomplished by varying the tension applied by belt tensioning means. In the preferred embodiment, the tensioning means is a spring-loaded idler pulley 42. The idler pulley 42 can be selectively adjusted to varying positions to increase or decrease the tension of the drive belt 50. The advantages of this belt drive system 10 will be explained more fully below.

Figure 2:
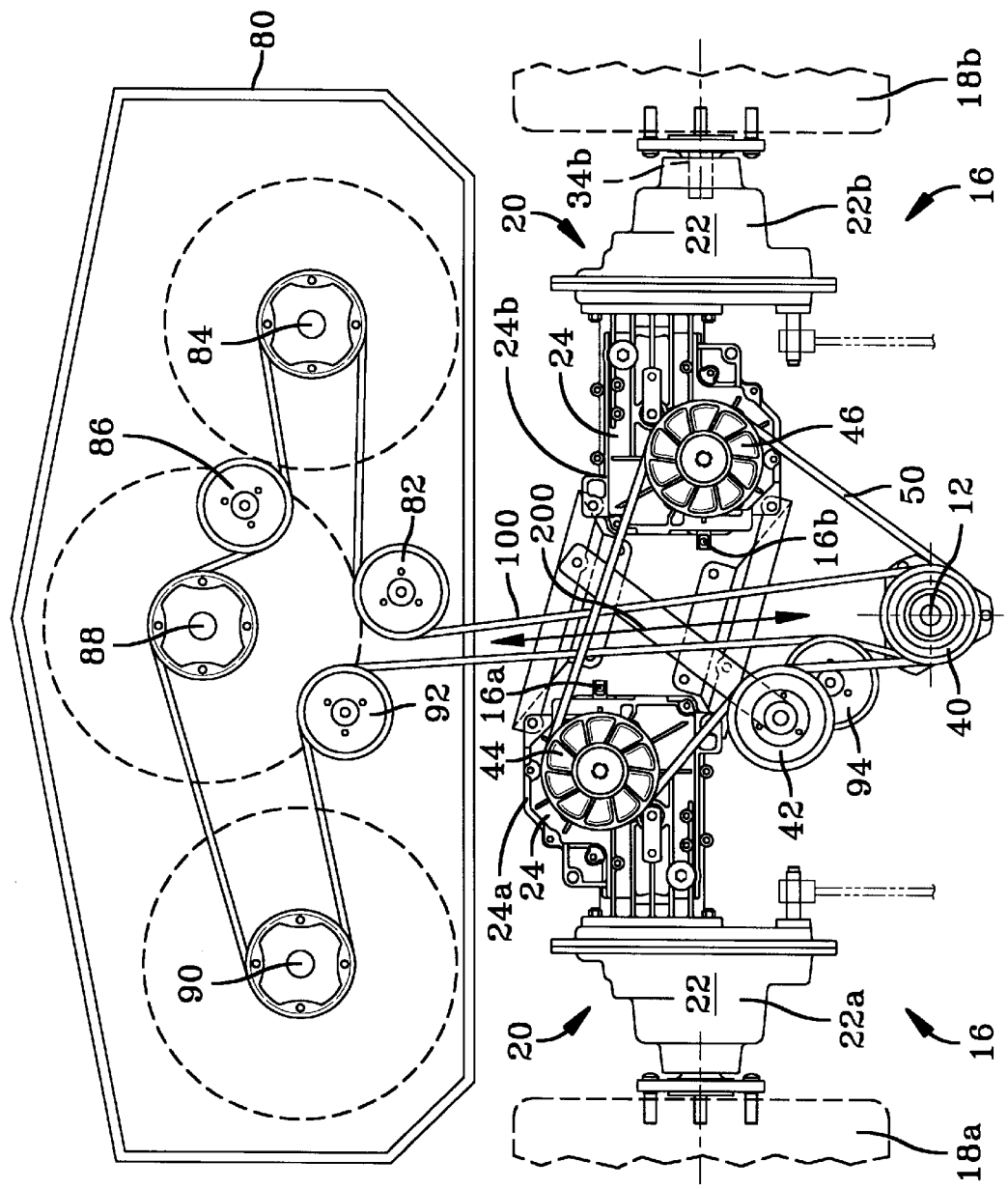
FIG. 2 is a top plan view of a lawn mower of this embodiment

The transmission of this invention is designed for use with a ground care device having a frame for controlled travel over a lawn or other grounds. This device may be a riding mower, a walk behind mower, a tractor, a utility vehicle, or other device utilized in ground care. The particular nature of the device (i.e. whether it be a riding, walk-behind, etc.) is unnecessary for appreciation of the applicant's invention as the invention could pertain to all types of vehicles utilizing a belt drive. FIG. 2 shows a top view of a portion of a vehicle utilizing a belt drive according to one embodiment of the invention. The vehicle has a frame (not shown), an engine drive shaft 12, left and right wheels 18a, 18b, a cutting unit 80 (a three-bladed mowing deck is shown), and control means 16 comprising left-hand control means 16a and right-hand control means 16b. The control means 16a, 16b are known in the art and typically control the speed, direction and braking. The front wheels (not shown) of the ground care device may be pivotally mounted to the frame. Pivotally mounting the front wheels to the frame will allow the device to spin about its rear axle.

An asymmetrical drive system 20 of this invention includes the use of two final ratio apparatuses 22. The preferred final ratio apparatuses 22 are symmetrical with respect to one another and they may be used on either the right-hand or left-hand side as they are not side-specific. Thus for clarity in discussion, they will be referred too as left-hand final ratio apparatus 22a and right-hand final ratio apparatus 22b. It is also preferred that the left-hand and right-hand final ratio apparatuses 22a, 22b are planetary reduction drive apparatuses. The asymmetrical drive system 20 also includes the use of two identical hydrostatic transmission power units 24. The preferred hydrostatic transmission power units 24 are also symmetrical with respect to one another and they may be used on either the right-hand or left-hand side as they are not side-specific. Thus for clarity in discussion, they will be referred too as as left-hand hydrostatic transmission power unit 24a and right-hand hydrostatic transmission power unit 24b.

The final ratio apparatuses 22a, 22b as shown in FIG. 2, combine the purposes of providing a speed reduction function in addition to mounting the wheels 18a, 18b and hydrostatic transmission power units 24a, 24b onto the frame. The preferred final ratio apparatuses 22a, 22b are mounted in mirror-image form as a pair of otherwise identical drives. The present application includes a way for compensating for the otherwise differing direction of rotation of the wheels 18a, 18b should this type of drive be connected to a motor rotating in a single direction.

Figure 3:
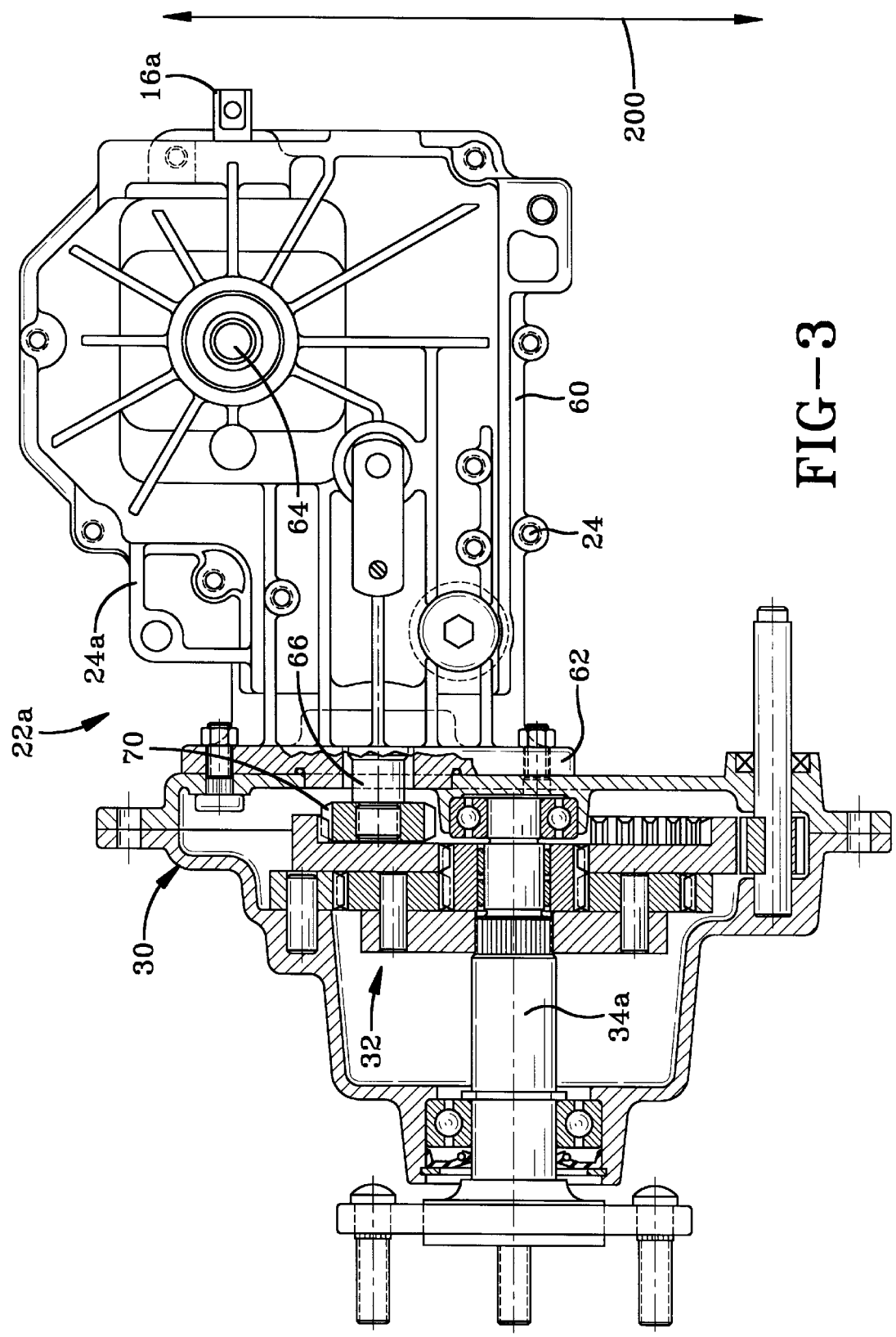
FIG. 3 is a partial cross-sectional view of the left side of the asymmetrical drive system of FIG. 2.

As shown in FIG. 3, the planetary reduction drive left-hand final ratio apparatus 22a includes an outer case or housing 30, a planetary reduction gear system 32 and an output shaft 34a. The left-hand hydrostatic transmission power unit 24a is interconnected to the left-hand final ratio apparatus 22a to provide rotative power to it. The left-hand hydrostatic transmission power unit 24a is driven by engine drive shaft 12. In the particular preferred embodiment disclosed, this left-hand hydrostatic transmission power unit 24a has a casing 60. This casing 60 serves to contain the movable parts of the left-hand hydrostatic transmission power unit 24a as well as serving to mount the left-hand hydrostatic transmission power unit 24a onto the outer case 30 of the planetary reduction system 32 by way of flange 62. The left-hand hydrostatic transmission power unit 24a includes a pump input shaft 64, a motor output shaft 66, and left-hand control means 16a.

With continuing reference to FIG. 3, the pump input shaft 64 is used to interconnect the left-hand hydrostatic transmission power unit 24a to a motor. Due to the advantages afforded by the present invention, this is easily accomplished by a single drive belt 50 with a single spring-loaded idler 42 as shown in FIG. 2. This pump input shaft 64 is typically rotated in a single direction although it is within the scope of this invention for the pump input shaft 64 to rotate in both directions. The motor output shaft 66 provides the output power for the left-hand hydrostatic transmission power unit 24a. In the preferred embodiment disclosed, this is accomplished by mounting the spur gear input shaft 70 of the left-hand final ratio apparatus 22a directly on the motor output shaft 66.

As shown in FIG. 2, the hydrostatic power units 24a, 24b and final ratio apparatuses 22a, 22b are asymmetric. An advantage of this asymmetric orientation is that the same power units can be provided for both sides of the ground care device and they utilize substantially the same physical components. Not only does this arrangement simplify the vehicle drive units but, on a monetary and inventory level, this halves the inventory requirements for the manufacturer and reduces the costs of repairs.

With reference now to FIGS. 2–3, by rotating the left-hand final ratio apparatus 22a 180° about line 200 which is perpendicular to the output shaft 34a and is equidistant from wheel 18a and wheel 18b, a substantially mirror image of left-hand final ratio apparatus 22a is produced and is identical to right-hand final ratio apparatus 22b. The left-hand hydrostatic power unit 24a, which is disconnected from left-hand final ratio apparatus 22a, is rotated 180° around the pump input shaft 64 before being bolted onto the right-hand final ratio apparatus 22b. This orientation causes the final ratio apparatuses 22a, 22b to rotate in opposite directions. The output shaft 34a of the left-hand final ratio apparatus 22a rotates counterclockwise for forward movement of wheel 18a and the output shaft 34b (shown by dashed lines in FIG. 2) of the right-hand final ratio apparatus 22b rotates clockwise for forward movement of wheel 18b but they both yield the same forward movement.

With reference to FIG. 2, the drive belt 50 interconnecting the respective hydrostatic power units 24a, 24b to the motor, via engine drive shaft 12, contributes to achieving this asymmetric result by being short, simple and not requiring compensation for the symmetric units. However, a single drive belt system could be used for a symmetric orientation of the hydrostatic power units incorporating different units for the right and left hand sides of the vehicle.

The belt drive system 10 described herein has further advantages which will be discussed herein. The belt drive system 10 can be used in conjunction with axillary apparatuses, such as cutting belt systems to yield further advantages. For example, the preferred three-bladed cutting unit 80 is shown in FIG. 2. Other cutting units incorporating more or less blades are within the scope of this invention.

Figure 4:
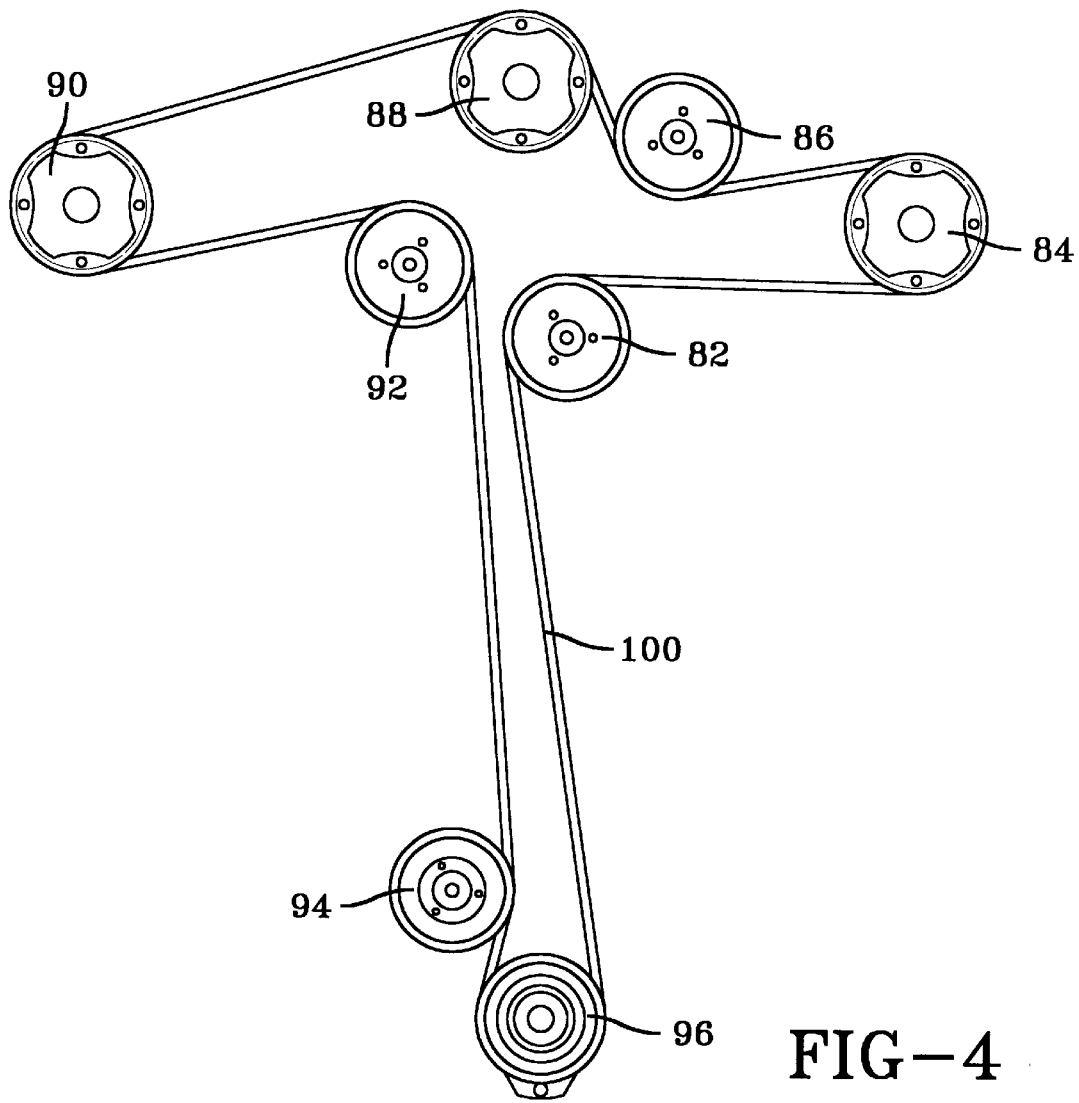
FIG. 4 is an illustration of a cutting belt system arrangement that could be used with the present invention.

Referring now to FIG. 4, the three-bladed cutting unit 80 has a cutting belt 100 which travels around a first idler pulley 82 which in this embodiment is fixed, a right hand blade spindle pulley 84, a second idler pulley 86 which in this embodiment is fixed, a center blade spindle pulley 88, a left hand blade spindle pulley 90, a third idler pulley 92 which in this preferred embodiment is spring-loaded, a fourth idler pulley 94 which is a cutter drive idler pulley and a cutting drive pulley 96. It is within the scope of this invention to incorporate different configurations of cutting belt systems having more or less pulleys. This cutting system 80, as shown in FIG. 2, is driven by engine drive shaft 12. However, in the preferred embodiment, the cutting belt system 80 is mounted below the belt drive system 10. The cutting belt 100 is situated between the left-hand and right-hand hydrostatic power units 24a, 24b. This configuration allows the cutting belt system 80 to be situated lower in height and therefore nearer to the mowing area, thereby giving a lower center of gravity to the cutting system. This provides for greater overall stability of the vehicle, a more uniform cutting apparatus, as well as other advantages known within the art of lawnmowers.

Although the invention has been described in its preferred embodiment with a certain degree of particularity, it is to be understood that numerous changes can be made without deviating from the invention as hereinafter claimed. For example, although the power units disclosed are hydrostatic power units, mechanical units could be substituted without departing from the scope of this invention. Further, differing final drive units could be utilized such as spur gear units, with or without multi-speed ranges. The shift on the fly drive system of U.S. Pat. No. 5,408,896 Power Transmission Drive System, with a multi-speed final ratio would be particularly suitable.

Having thus described the invention, it is now claimed:

1. A belt drive system for use with a dual hydrostatic power unit having an input shaft adapted to be driven, said system comprising:

a driving belt pulley adapted to be mounted on an engine drive shaft;

a idler pulley;

a right-hand hydrostatic power unit pulley operatively connected to a right-hand hydrostatic power unit;

a left-hand hydrostatic power unit pulley operatively connected to a left-hand hydrostatic power unit;

a drive belt mounted on said drive belt pulley, said idler belt pulley, said right-hand hydrostatic power unit pulley, and said left-hand hydrostatic power unit pulley; and wherein said left-hand hydrostatic power unit and said right-hand hydrostatic power unit are asymmetric.

2. The belt drive system of claim 1 including belt tensioning means.

3. The belt drive system of claim 1 wherein said idler belt pulley is spring-loaded.

4. The belt drive system of claim 2 wherein said belt tensioning means is selectively adjustable to varying positions.

5. The belt drive system of claim 1 further comprising a cutting belt system, said cutting belt system comprising:

a cutting drive pulley adapted to be mounted on said engine drive shaft;

a first idler pulley;

a right-hand blade spindle belt pulley;

a second idler pulley;

a left-hand blade spindle belt pulley;

a third idler pulley;

a cutting belt mounted on said driving belt pulley, said first idler pulley, said right-hand blade spindle belt pulley, said left-hand blade spindle belt pulley, said second idler pulley and said third idler pulley.

6. The belt drive system of claim 5 including a first belt tensioning means for tensioning said cutting belt.

7. The belt drive system of claim 5 wherein said third idler belt pulley is spring-loaded.

8. The belt drive system of claim 6 wherein said first belt tensioning means is selectively adjustable to varying positions.

9. The belt drive system of claim 6 having a second belt tensioning means for tensioning said cutting belt.

10. The belt drive system of claim 9 wherein said second belt tensioning means is selectively adjustable to varying positions.

11. The belt drive system of claim 9 having a third belt tensioning means for tensioning said cutting belt.

12. The belt drive system of claim 11 wherein said third belt tensioning means is selectively adjustable to varying positions.

13. The belt drive system of claim 5 wherein said cutting belt system is mounted below said belt drive system thereby having a center of gravity lower than the belt drive system.

14. The belt drive system of claim 1 wherein said drive pulley is mounted between said left-hand hydrostatic power unit and said right-hand hydrostatic power unit.

15. The belt drive system of claim 5 wherein said driving belt pulley of said belt drive system is mounted between said left-hand hydrostatic power unit and said right-hand hydrostatic power unit.

16. The belt drive system of claim 5 wherein said left-hand hydrostatic pulley and said right-hand hydrostatic pulley have a longitudinal distance X1 between them, said longitudinal distance X1 being between 1.0 inch, and 36.0 inches.

17. The belt drive system of claim 5 wherein said driving belt pulley of said cutting belt system is mounted between said right hand hydrostatic pulley and said left hand hydrostatic pulley.

\* \* \* \* \*